United States Patent Office 3,005,844
Patented Oct. 24, 1961

3,005,844
HYDRAZONIUM SALT OF N-CARBO-
BENZOXY-DL-SERINE
William Shive and Charles Gordon Skinner, Jr.,
Austin, Tex.
No Drawing. Filed Dec. 15, 1959, Ser. No. 859,584
1 Claim. (Cl. 260—482)

This invention relates to the hydrazonium salt of N-carbobenzoxy-DL-serine of the formula:

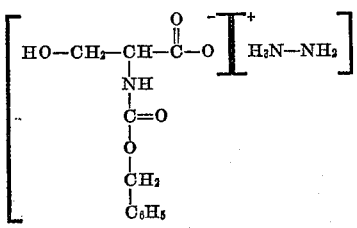

This novel compound is prepared by reacting N-carbobenzoxy-DL-serine with hydrazine. The reaction can be carried out at room temperature merely by bringing the reactants together, preferably in a suitable organic medium, such as ethanol. The product is recovered and purified by any convenient method.

The compound of this invention is useful as an antibacterial, inhibiting the growth, for example, of *Lactobacillus arabinosus* and *Streptococcus lactis*. It is well known in the bacteriological art that the later organism is primarily responsible for souring raw milk. See "Principles of Microbiology," Carter and Smith (1954), page 549, and "Microbiology, General and Applied," Sarles and Frazier (1947), page 199. A 0.1% solution of this compound in water is useful as a rinse for dairy equipment.

The invention will be described in greater detail by the following specific example:

Example

A mixture of 2.39 g. of N-carbobenzoxy-DL-serine in 30 ml. of ethanol containing 1.0 ml. of hydrazine was allowed to stand at room temperature for 12 hours. After removal of the solvent and excess hydrazine in vacuo, the residue was crystallized from aqueous ethanol to yield 2.2 g. of the corresponding hydrazonium salt, M.P. 80–83°.

Anal.—Calcd. for $C_{11}H_{13}NO_5 \cdot N_2H_4$: N, 15.49. Found: N, 15.53.

This application is a continuation-in-part of application Number 778,325, filed December 5, 1958 and now abandoned.

The invention claimed is:
The hydrazonium salt of N-carbobenzoxy-DL-serine.

References Cited in the file of this patent

Skinner et al.: J. Am. Chem. Soc., vol. 78, pp. 2412–2414 (1956).
McCord et al.: J. Am. Chem. Soc., vol. 80, No. 14, pp. 2762–4, July 20, 1958.